(12) United States Patent
Tajbakhsh et al.

(10) Patent No.: US 11,100,620 B2
(45) Date of Patent: Aug. 24, 2021

(54) HUE PRESERVATION POST PROCESSING FOR HIGHLIGHT RECOVERY

(71) Applicant: Apple Inc., Cupertino, CA (US)

(72) Inventors: Touraj Tajbakhsh, San Jose, CA (US); Chihsin Wu, San Jose, CA (US); Frederic Cao, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 388 days.

(21) Appl. No.: 16/121,389

(22) Filed: Sep. 4, 2018

(65) Prior Publication Data

US 2020/0074601 A1 Mar. 5, 2020

(51) Int. Cl.
*G06T 5/00* (2006.01)
*H04N 9/64* (2006.01)
*G06T 7/90* (2017.01)

(52) U.S. Cl.
CPC ............ *G06T 5/009* (2013.01); *G06T 7/90* (2017.01); *H04N 9/643* (2013.01); *G06T 2207/10024* (2013.01); *G06T 2207/20208* (2013.01)

(58) Field of Classification Search
CPC combination set(s) only.
See application file for complete search history.

(56) References Cited

U.S. PATENT DOCUMENTS

| | | | |
|---|---|---|---|
| 6,757,428 B1 | 6/2004 | Lin et al. | |
| 8,164,594 B2 | 4/2012 | Watanabe et al. | |
| 8,441,498 B2 | 5/2013 | Lammers et al. | |
| 8,503,815 B2 | 8/2013 | Dvir | |
| 8,537,177 B2 | 9/2013 | Bhaskaran et al. | |
| 8,570,341 B1 * | 10/2013 | Xie .................. | H04N 9/68 345/600 |
| 9,489,706 B2 | 11/2016 | Levy et al. | |
| 9,635,332 B2 | 4/2017 | Carroll | |
| 9,743,057 B2 | 8/2017 | Cote et al. | |
| 9,819,938 B2 | 11/2017 | Jia et al. | |

(Continued)

FOREIGN PATENT DOCUMENTS

| | | |
|---|---|---|
| EP | 3113494 A1 | 1/2017 |
| WO | WO 2011/067755 A1 | 6/2011 |

OTHER PUBLICATIONS

Rouf, M. et al. "Gradient domain color restoration of clipped highlights," IEEE Computer Society Conference on Computer Vision and Pattern Recognition, 2012, 8 pages.

(Continued)

*Primary Examiner* — Zhiyu Lu
(74) *Attorney, Agent, or Firm* — Fenwick & West LLP

(57) ABSTRACT

Embodiments relate to hue preservation post processing for highlight recovery of an input image. Intensity values for multiple color channels of a plurality of color channels of a pixel of the input image is determined using corresponding ratios of target hues for the plurality of color channels of the pixel, wherein the pixel has at least one color channel with an intensity above a predetermined threshold. A hue preserved value for a color channel of the plurality of color channels of the pixel is determined using intensity values determined for the plurality of color channels of the pixel and the target hues. A recovered version of the input image is generated by adjusting hue information of the pixel, using the hue preserved value for the channel of the plurality of color channels of the pixel.

20 Claims, 7 Drawing Sheets

(56) References Cited

U.S. PATENT DOCUMENTS

| | | |
|---|---|---|
| 10,070,109 B2 | 9/2018 | Lim et al. |
| 2002/0031256 A1* | 3/2002 | Hiramatsu ............ H04N 1/6027 382/162 |
| 2002/0054307 A1* | 5/2002 | Matsuoka ............. G06T 11/001 358/1.9 |
| 2003/0043391 A1 | 3/2003 | Childs et al. |
| 2003/0164968 A1* | 9/2003 | Lida ..................... H04N 1/6058 358/1.9 |
| 2003/0222991 A1 | 12/2003 | Muammar et al. |
| 2004/0109072 A1 | 6/2004 | Gallagher |
| 2006/0050957 A1* | 3/2006 | Naccari ............. G06K 9/00664 382/165 |
| 2007/0002153 A1* | 1/2007 | Dierickx ............ H04N 9/04515 348/272 |
| 2007/0076277 A1 | 4/2007 | Miyawaki et al. |
| 2007/0139437 A1* | 6/2007 | Boroson ............. H01L 27/3213 345/590 |
| 2007/0211177 A1* | 9/2007 | Lee ........................ H04N 9/643 348/649 |
| 2008/0117318 A1 | 5/2008 | Aoki |
| 2008/0285884 A1 | 11/2008 | Nishijima |
| 2011/0255779 A1 | 10/2011 | Sloan |
| 2011/0280494 A1 | 11/2011 | Da Rocha Leitao et al. |
| 2012/0002082 A1 | 1/2012 | Johnson et al. |
| 2012/0201450 A1* | 8/2012 | Bryant ..................... H04N 1/62 382/162 |
| 2012/0249828 A1 | 10/2012 | Sun |
| 2012/0288192 A1* | 11/2012 | Heidrich ................ G06T 5/005 382/167 |
| 2013/0208994 A1 | 8/2013 | Shirata |
| 2013/0321679 A1 | 12/2013 | Lim et al. |
| 2015/0015740 A1 | 1/2015 | Cho et al. |
| 2015/0049939 A1 | 2/2015 | Siddiqui |
| 2016/0171918 A1* | 6/2016 | Kim ......................... G09G 5/02 345/690 |
| 2016/0267686 A1 | 9/2016 | Ohta |
| 2017/0061592 A1 | 3/2017 | Reinhard et al. |
| 2017/0070689 A1 | 3/2017 | Silverstein et al. |
| 2017/0316553 A1 | 11/2017 | Luka |
| 2018/0007332 A1 | 1/2018 | Lim et al. |
| 2018/0211370 A1 | 7/2018 | Chen et al. |
| 2018/0324329 A1* | 11/2018 | Thebault ............... G06T 3/4007 |
| 2019/0114749 A1* | 4/2019 | Pouli ...................... G06T 5/009 |
| 2019/0325802 A1* | 10/2019 | Aly ....................... G09G 3/2003 |

OTHER PUBLICATIONS

United States Office Action, U.S. Appl. No. 16/116,838, dated Feb. 28, 2020, 18 pages.

United States Office Action, U.S. Appl. No. 16/116,838, dated May 1, 2020, 21 pages.

* cited by examiner

HUE PRESERVATION POST PROCESSING FOR HIGHLIGHT RECOVERY

BACKGROUND

1. Field of the Disclosure

The present disclosure relates to a circuit for processing images and more specifically to a circuit for hue preservation post processing for highlight recovery.

2. Description of the Related Arts

Image data captured by an image sensor or received from other data sources is often processed prior to further processing or consumption. For example, raw image data may be corrected, filtered, or otherwise modified before being provided to subsequent components such as a video encoder. Performing the image processing on a device uses system resources. For example, image processing algorithms may be performed by executing software programs on a central processing unit (CPU). However, the execution on the CPU consumes resources of the CPU and memory, and can interfere with processing of other tasks or increase power consumption.

SUMMARY

Embodiments of the present disclosure relate to hue preservation post processing for highlight recovery of an input image. Intensity values for multiple color channels of a plurality of color channels of a pixel of the input image are determined using corresponding ratios of target hues for the plurality of color channels of the pixel. The pixel has at least one color channel with an intensity above a predetermined threshold. A hue preserved value for a color channel of the plurality of color channels of the pixel is determined using intensity values determined for the plurality of color channels of the pixel and the target hues. A recovered version of the input image is generated by adjusting hue information of the pixel, using one or more hue preserved values for the one or more color channels of the plurality of color channels of the pixel.

Figure 1:
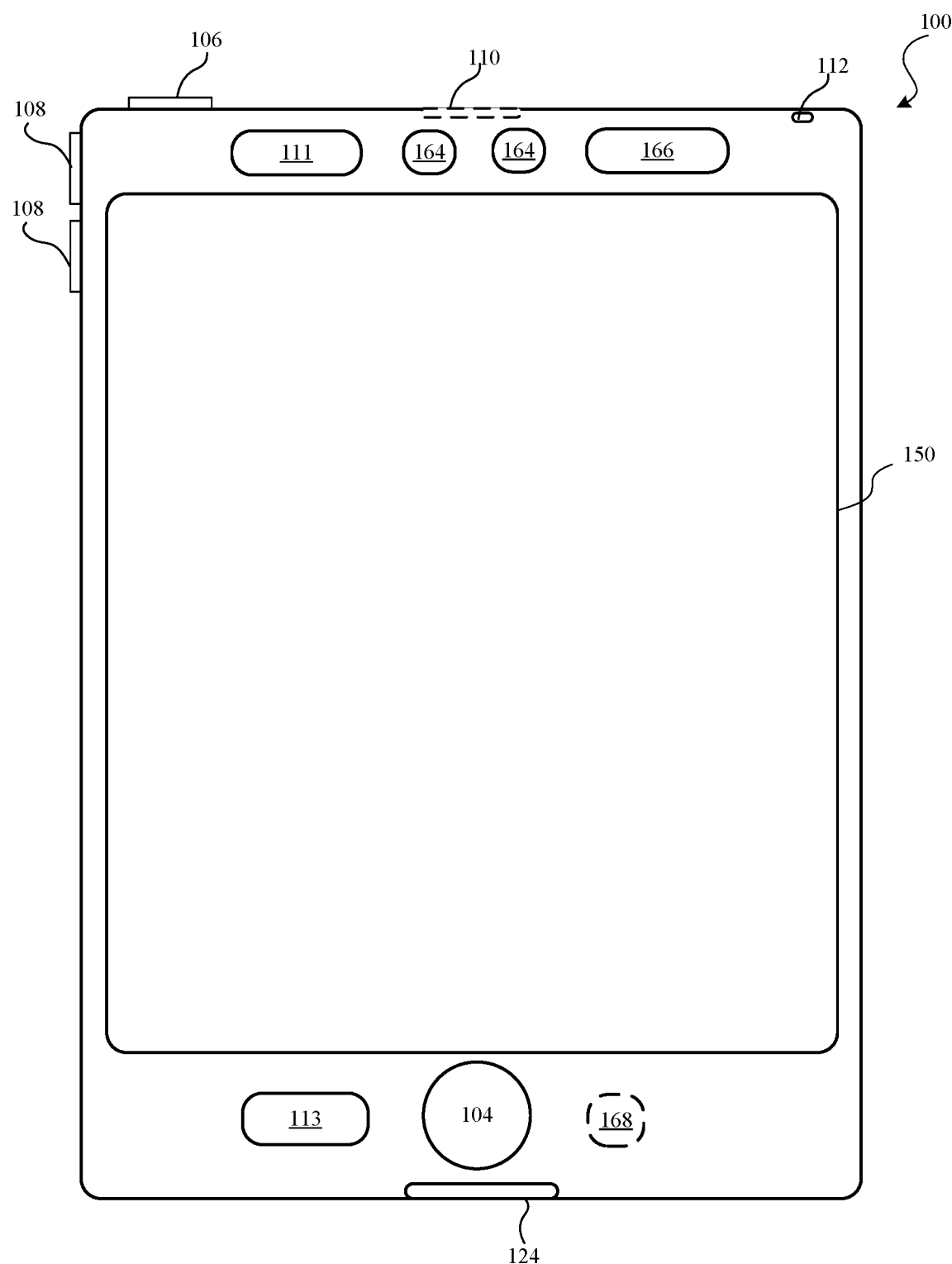
FIG. 1 is a high-level diagram of an electronic device, according to one embodiment

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to hue preservation post processing for highlight recovery of overexposed portions of a high-resolution image using a low-resolution image (e.g., thumbnail). The thumbnail is captured immediately before or after capturing the high-resolution image at a lower exposure than that of the high-resolution image to reduce the probability of clipping pixel color channels. A target hue value for each pixel color channel of the high-resolution image is calculated from a set of low-resolution candidate hue maps obtained by processing the thumbnail. An intensity value (e.g., a soft clipped value) is determined for each color channel of a pixel in the high-resolution image, using corresponding ratios of target hues for a plurality of color channels of the pixel. A hue preserved value for at least one color channel of the pixel is determined, using determined intensity values and the target hues for the plurality of color channels of the pixel. A recovered version of at least one pixel color channel is generated using the determined hue preserved value for the at least one pixel color channel. The recovery process may be repeated for one or more color channels of all pixels of the high-resolution image irrespective of whether those pixels have a clipped color channel or not. As a result, a high-resolution image with clipped portions can be transformed into a hue corrected version of the same image.

The term "hue" described herein refers to a representation of color of an image. For example, the hue of a pixel can be represented by a mix of Red, Green, and Blue channels. Compared to 'color', 'hue' represents a 2D property of color not comprising luminance. The terms "hue" and "color" are used interchangeably throughout this disclosure.

Color digital images are made of pixels, and pixels are made of combinations of primary colors represented by a series of code. An example RGB image has three channels: Red, Green, and Blue. The term "channel" described herein refers to one of the Red channel, the Green channel, or the Blue channel, of an image using the RGB color format.

The term "full-resolution" of an image described herein refers to the highest resolution of the image sensor used for capturing the image. The term "high-resolution" described herein refers to a resolution that is closer to the full-resolution than to a resolution of a low-resolution of the thumbnail as defined below.

The term "low-resolution" of an image described herein refers to a resolution that is much lower than the full-resolution. For example, if the full-resolution is 1920×1280 pixels, low-resolution may be 400×300 pixels or lower. The terms "low-resolution" and "thumbnail" are used interchangeably throughout this disclosure.

The image pixels as described herein have a default 8-bit range for hue values, for example from level 0 and level 255, unless otherwise specified.

The term "clipping" described herein refers to a color intensity of an area of the image (e.g., a pixel) that is higher than the maximum color intensity of the image sensor used to capture the image. For example, if the upper limit of the image sensor's hue dynamic range is represented by level 255, a pixel channel is deemed to be clipped when the actual color intensity of the pixel channel is higher than level 255 (e.g., level 400) even though the image sensor only registers a level 255 due to its finite dynamic range. The terms "clipping" and "saturation" are used interchangeably throughout this disclosure. The term "clipping" described herein can also refer to a color intensity of a pixel that is higher than a predetermined threshold, which can be less than the maximum color intensity.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. The device 100 may include components not shown in FIG. 1.

Device 100 is only one example of an electronic device, and device 100 may have more or fewer components than listed above, some of which may be combined into a components or have a different configuration or arrangement. The various components of device 100 listed above are embodied in hardware, software, firmware or a combination thereof, including one or more signal processing and/or application specific integrated circuits (ASICs).

Figure 2:
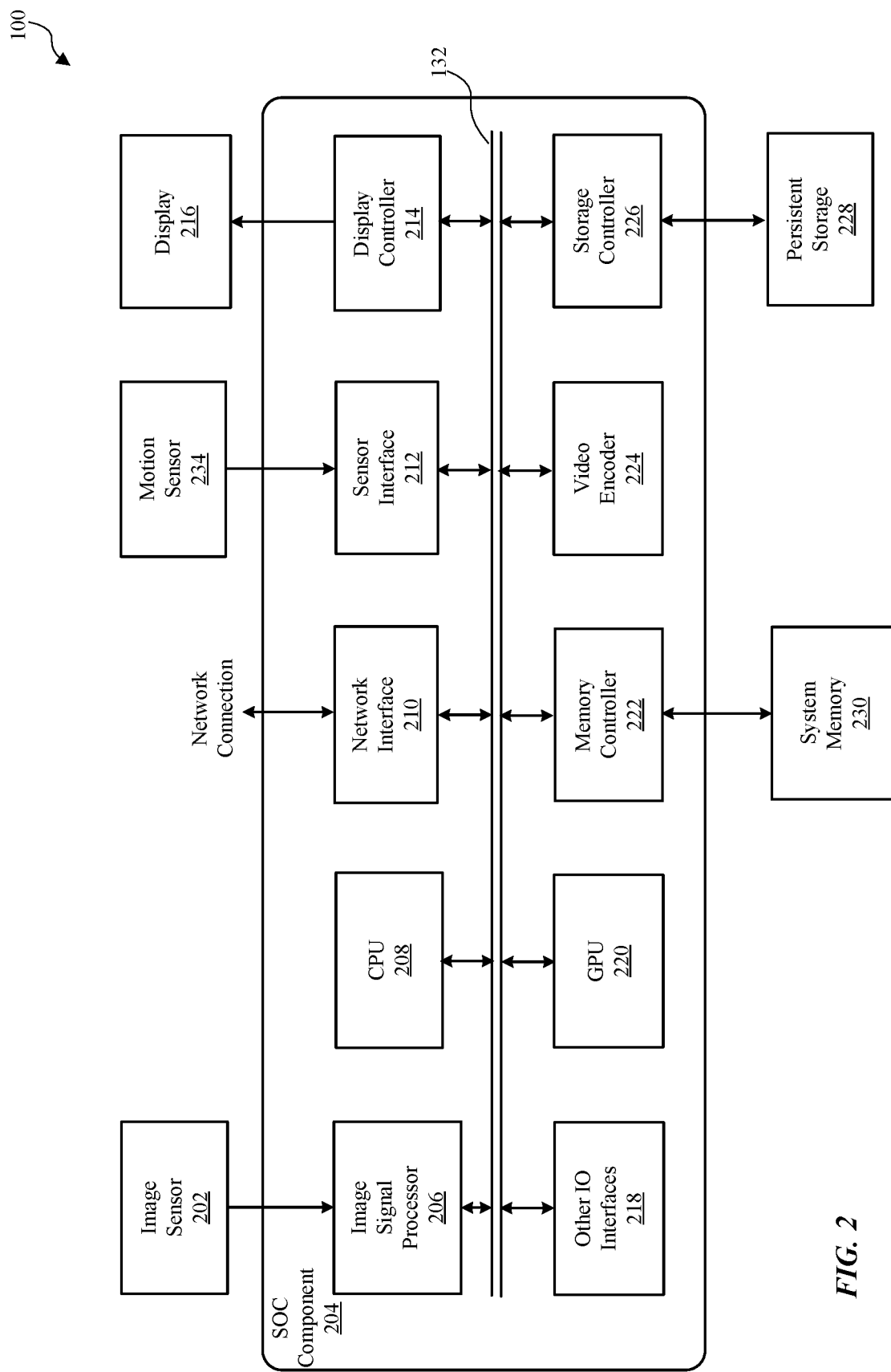
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, orientation sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensor 202 is a component for capturing image data and may be embodied, for example, as a complementary metal-oxide-semiconductor (CMOS) active-pixel sensor) a camera, video camera, or other devices. Image sensor 202 generates raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color filter array (CFA) pattern (hereinafter also referred to as "Bayer pattern").

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, sensor interface 212, display controller 214, graphics processor (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface 210 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensor 202 and processed by ISP 206, and then sent to system memory 230 via bus 232 and memory controller 222. After the image data is stored in system memory 230, it may be accessed by video encoder 224 for encoding or by display 116 for displaying via bus 232.

In another example, image data is received from sources other than the image sensor 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
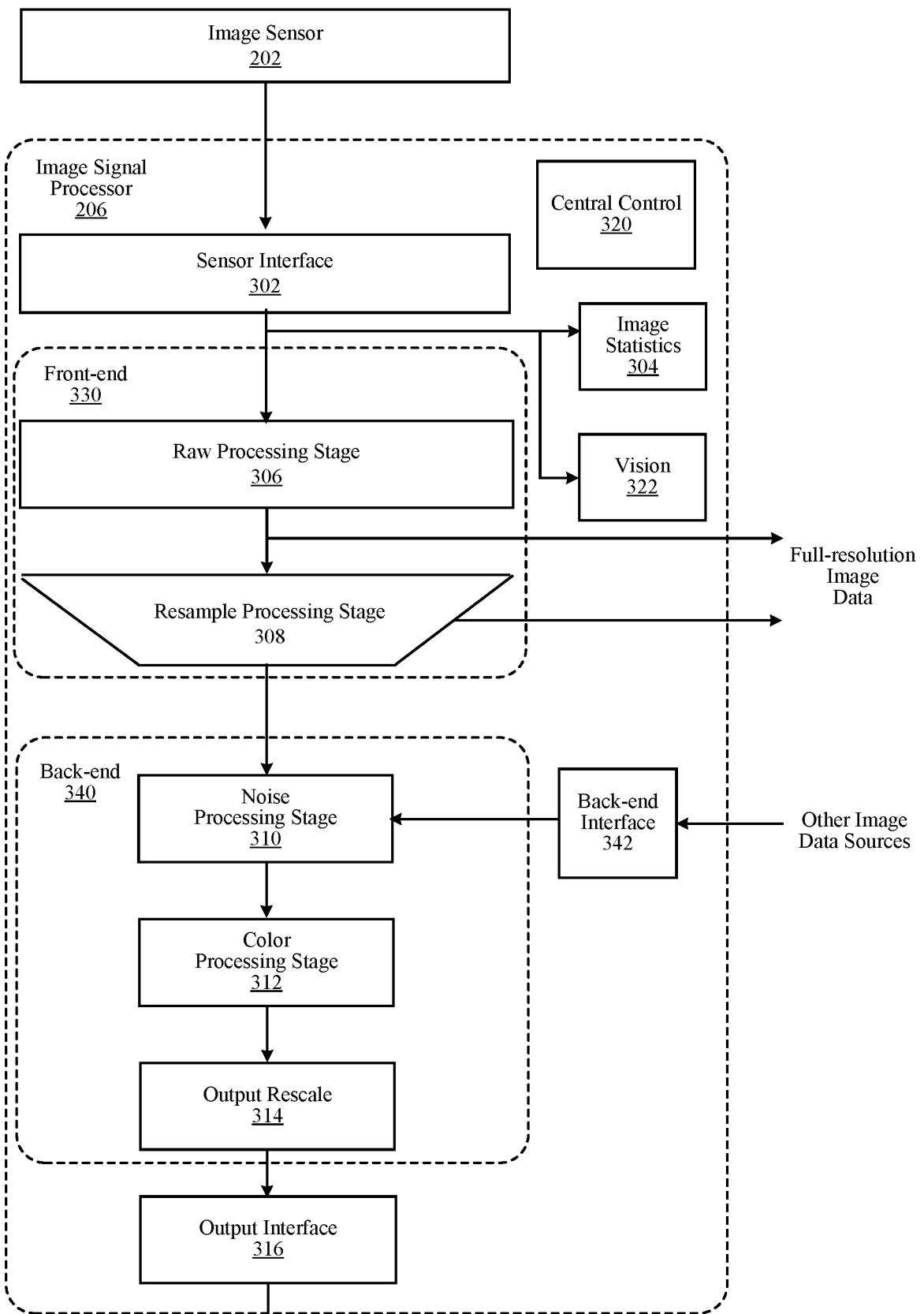
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 206 is coupled to image sensor 202 to receive raw image data. ISP 206 implements an image processing pipeline which may include a set of stages that process image information from creation, capture or receipt to output. ISP 206 may include, among other components, sensor interface 302, central control module 320, front-end pipeline stages 330, back-end pipeline stages 340, image statistics module 304, vision module 322, back-end interface 342, and output interface 316. ISP 206 may include other components not illustrated in FIG. 3 or may omit one or more components illustrated in FIG. 3.

Sensor interface 302 receives raw image data from image sensor 202 and processes the raw image data into an image data processable by other stages in the pipeline. Sensor interface 302 may perform various preprocessing operations, such as image cropping, binning or scaling to reduce image data size. In some embodiments, pixels are sent from the image sensor 202 to sensor interface 302 in raster order (i.e., horizontally, line by line). The subsequent processes in the pipeline may also be performed in raster order and the result may also be output in raster order. Although only a single image sensor and a single sensor interface 302 are illustrated in FIG. 3, when more than one image sensor is provided in device 100, a corresponding number of sensor interfaces may be provided in ISP 206 to process raw image data from each image sensor.

Front-end pipeline stages 330 process image data in raw or full-color domains. Front-end pipeline stages 330 may include, but are not limited to, raw processing stage 306 and resample processing stage 308. A raw image data may be in Bayer raw format, for example. In Bayer raw image format, pixel data with values specific to a particular color (instead of all colors) is provided in each pixel. In an image capturing sensor, image data is typically provided in a Bayer pattern. Raw processing stage 306 may process image data in a Bayer raw format.

The operations performed by raw processing stage 306 include, but are not limited, sensor linearization, black level compensation, fixed pattern noise reduction, defective pixel correction, raw noise filtering, lens shading correction, white balance gain, and highlight recovery. Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a dropoff in intensity as a function of a distance from a lens optical center. White balance gain refers to providing digital gains for white balance, offset and clip independently for all color components (e.g., Gr, R, B, Gb in Bayer format). Components of ISP 206 may convert raw image data into image data in full-color domain, and thus, raw processing stage 306 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform special image effects, including black and white conversion, sepia tone conversion, negative conversion, or solarize conversion. For the purpose of Gamma mapping, lookup tables (or other structures that index pixel values to another value) for different color components or channels of each pixel (e.g., a separate lookup table for Y, Cb, and Cr color components) may be used. Color space conversion refers to converting color space of an input image data into a different format. In one embodiment, resample processing stage 308 converts RBD format into YCbCr format for further processing.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, mask patterned defective pixels, sub-sample raw image data, detect and replace non-patterned defective pixels, black level compensation, lens shading correction, and inverse black level compensation. After performing one or more of such operations, statistics information such as 3A statistics (Auto white balance (AWB), auto exposure (AE), auto focus (AF)), histograms (e.g., 2D color or component) and any other image data information may be collected or tracked. In some embodiments, certain pixels' values, or areas of pixel values may be excluded from collections of certain statistics data (e.g., AF statistics) when preceding operations identify clipped pixels. Although only a single statistics module 304 is illustrated in FIG. 3, multiple image statistics modules may be included in ISP 206. In such embodiments, each statistic module may be programmed by central control module 320 to collect different information for the same or different image data.

Vision module 322 performs various operations to facilitate computer vision operations at CPU 208 such as facial detection in image data. The vision module 322 may perform various operations including pre-processing, global tone-mapping and Gamma correction, vision noise filtering, resizing, keypoint detection, generation of histogram-of-orientation gradients (HOG) and normalized cross correlation (NCC). The pre-processing may include subsampling or binning operation and computation of luminance if the input image data is not in YCrCb format. Global mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing cameral pose and object tracking. Keypoint detection refers to the process of identifying such keypoints in an image. HOG provides descriptions of image patches for tasks in image analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations. NCC is the process of computing spatial cross correlation between a patch of image and a kernel.

Back-end interface 342 receives image data from other image sources than image sensor 202 and forwards it to other components of ISP 206 for processing. For example, image data may be received over a network connection and be stored in system memory 230. Back-end interface 342 retrieves the image data stored in system memory 230 and provide it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform special image effects. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (i.e. no color). In some embodiment, the luma sharpening and chroma suppression may be performed simultaneously with spatial nose filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame (and thus is not a spatially filtered reference frame).

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, output rescale module 314 may implement a table of piecewise perspective transforms encoded as digital difference analyzer (DDA) steppers to perform a per-pixel perspective transformation between input image data and output image data in order to correct artifacts and motion caused by sensor motion during the capture of the image frame. Output rescale may provide image data via output interface 316 to various other components of system 100, as discussed above with regard to FIGS. 1 and 2.

In various embodiments, the functionally of components 302 through 342 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Example Image Signal Processing Pipeline for Hue Preservation Post Processing

Figure 4:
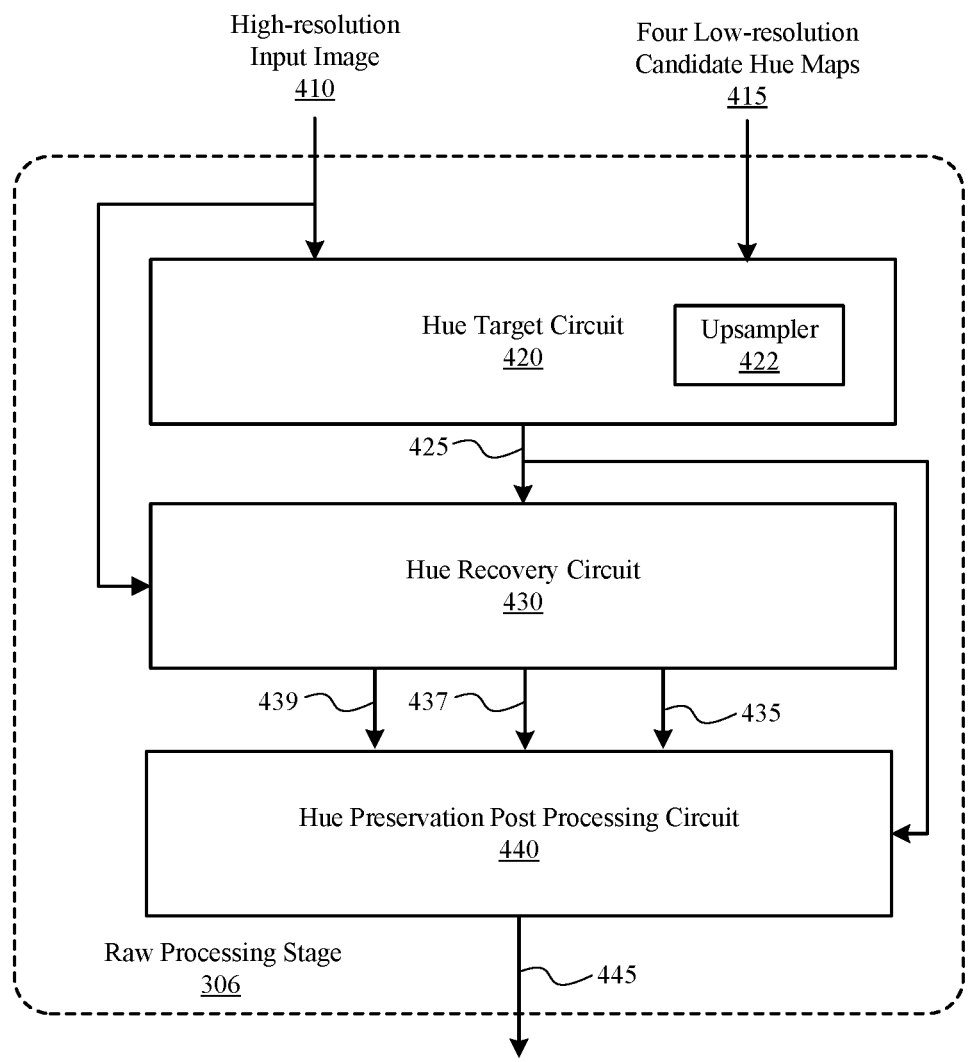
FIG. 4 is a block diagram illustrating a raw processing stage of the image processing pipeline of FIG. 3, according to one embodiment.

FIG. 4 is a block diagram illustrating raw processing stage 306 of the image processing pipeline of FIG. 3 for hue preservation post processing used in highlight recovery of an input image, according to one embodiment. Raw processing stage 306 recovers color channel(s) of a pixel having intensity value(s) above a predetermined threshold (hereinafter "clipped color channel(s)") by generating candidate hue maps, determining target hue values for each color channel of the pixel, determining recovered hue values for each color channel of the pixel, and performing hue preservation post processing. Raw processing stage 306 may include, among other components, hue target circuit 420 for determining target hue values, hue recovery circuit 430 for determining recovered hue values, and hue preservation post processing (HPPP) circuit 440 for post processing of recovered hue values to generate hue preserved values. Hue target circuit 420, hue recovery circuit 430, and HPPP circuit 440 may include various logic gates, registers and other circuits to implement their respective functions.

Hue target circuit 420 is a circuit that determines target hue 425 for each color channel of a pixel in high-resolution input image 410 having clipped color channel(s). Hue target circuit 420 receives input image 410 at high-resolution (hereinafter "input image") that may include one or more pixels with clipped color channels. The high-resolution of input image 410 may be close to or equal to the full-resolution of image sensor 202. In one embodiment, input image 410 is received from image sensor 202 via sensor interface 302. Alternatively, input image 410 is received from a memory (e.g., from persistent storage 228 or system memory 230) that stores the image data captured by image sensor 202. Some of the pixels may include more than one clipped color channel. If a pixel includes two clipped color channels, the two clipped color channels may still be recovered based on the information of the unclipped third color channel. However, if all three color channels of pixel are clipped, it may not be possible to recover any of the three clipped color channels.

Hue target circuit 420 also receives a set of candidate hue maps 415 (e.g., four candidate hue maps) from outside of the ISP 206 (e.g., from persistent storage 228 or system memory 230) or from a hue map generator circuit of raw processing stage 306 (not shown in FIG. 4). Each candidate hue map includes a candidate hue value for each color channel of each pixel of the hue map. The set of candidate hue maps are generated from a low-resolution image (or thumbnail) captured by image sensor 202. Image sensor 202 captures the thumbnail at almost the same time as that of capturing input image 410 such that the thumbnail and input image 410 capture substantially the same scene. The thumbnail is captured at an exposure that is lower than that of input image 410 to reduce the possibility of clipping of the pixel color channels. For example, the thumbnail may be captured at an exposure value that is 8 times lower than that of input image 410. By capturing the thumbnail at a lower exposure value, the thumbnail likely avoids clipping color channels of its pixels. In one embodiment, none of the pixel color channels of the thumbnail are clipped such that every pixel color channel has an actual hue value that falls within the dynamic range of image sensor 202.

Candidate hue maps 415 correspond to the same scene as input image 410, but are at a resolution that is much lower than that of the high-resolution of input image 410. For example, if an input image includes 1920×1080 pixels, its corresponding thumbnail may include 100×100 pixels and the corresponding candidate hue maps include 100×100 pixels. In this example, each candidate hue map 415 includes a candidate hue value for each color channel of the 100×100 pixels. While example embodiments of this disclosure use four thumbnails for recovering clipped color channels, the set of thumbnails may include fewer than or more than four thumbnails.

Hue target circuit 420 uses upsampler circuit 422 to generate upsampled candidate hue maps for each of the received set of candidate hue maps 415. The upsampled candidate hue maps are at the same resolution as that of input image 410. In the above example when input image 410 includes 1920×1080 pixels and each of the received candidate hue map 415 includes 100×100 pixels, each of the upsampled candidate hue maps include 1920×1080 pixels. In this example, each upsampled candidate hue map includes a candidate hue value for each color channel of the 1920×1080 pixels. Hue target circuit 420 then determines target hue 425 for each color channel of each pixel of the input image by processing both the actual hue from input image 410 and the candidate hue values from each of the set of upsampled candidate hue maps. Additional details regarding determining target hues are discussed in U.S. application Ser. No. 15/198,354, filed on Jun. 30, 2016, which is incorporated by reference herein in its entirety.

Hue recovery circuit 430 is a circuit that recovers hue information in input image 410, and generates a recovered image with corrected hue information. Specifically, hue recovery circuit 430 generates recovered hue values 435, 437, 439 for a plurality of color channels (e.g., three color channel for RGB color format) of a pixel in input image 410 using target hues 425 for the plurality of color channels of the pixel. For each color channel, hue recovery circuit 430 determines two possible recovered hue values and mixes between them to smooth transitions. Hue recovery circuit 430 then blends the recovered hue value with that of an observed hue value of the pixel channel based on how close the observed hue value is from clipping for the given color channel. The observed hue value of a pixel as described herein is the hue value of the full resolution input image. For example, if the observed hue value is far from the clipping value (e.g., level 50 on a scale of 0-255), hue recovery circuit 430 selects the observed hue value and if the observed hue value is close to clipping (e.g., level 225 on the scale of 0-255) or is actually clipped (e.g., level 255 on the scale of 0-255), the recovered hue value is selected. Hue recovery circuit 430 may also perform soft clipping to ensure that the recovered values 435, 437, 439 stay with the maximum hue values for each color channel (e.g., within level 255 on a scale ranging from level 0 to 255). Additional details regarding generating recovered hue values are discussed in U.S. application Ser. No. 15/198,354, filed on Jun. 30, 2016.

HPPP circuit 440 is a circuit that performs hue preservation post processing to preserve any hue values that might have altered during soft clipping. Since the soft clipping performs compression (or expansion) of each color channel independently, the soft clipping does not guarantee that target hues are preserved. HPPP circuit 440 performs post processing of soft clipped recovered hue values 435, 437, 439 with the constraint that cross channel ratios of target hue values 425 and soft clipped values after hue preservation post processing remain constant. HPPP circuit 440 obtains hue preserved post processed (HPPP) value 445 for at least one color channel of each pixel in input image 410, i.e., HPPP circuit 440 generates a recovered version of input image with preserved hue. More details about structure and operation of HPPP circuit 440 are described below with reference to FIGS. 5 through 7.

Early Exit of Hue Preservation Post Processing

Figure 5:
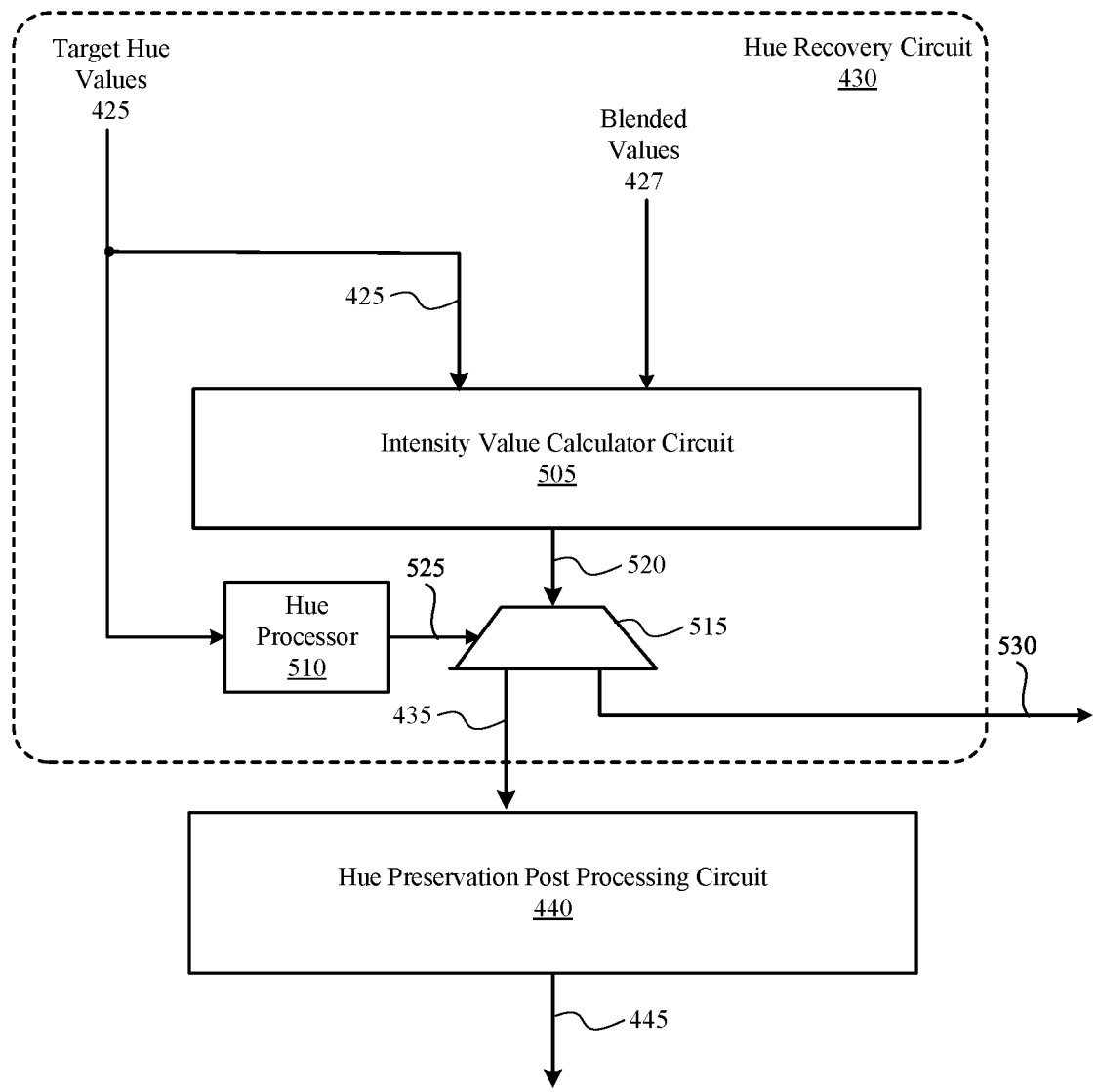
FIG. 5 is a block diagram illustrating circuitry for early exit of hue preservation post processing, according to one embodiment.

FIG. 5 is a block diagram illustrating circuitry for early exit of hue preservation post processing, according to one embodiment. Hue recovery circuit 430 may include intensity value calculator circuit 505 and hue processor 510 coupled to demultiplexer 515. Intensity value calculator circuit 505 generates soft clipped value 520 for a color channel under consideration for hue preservation post processing of the plurality of color channel of a pixel, using corresponding ratios of target hue values 425 for the plurality of color channels and corresponding blending value 427 for the color channel of the pixel. As discussed above with reference to FIG. 4, hue recovery circuit 430 blends the recovered hue value with that of an observed hue value of the pixel channel to generate blended value 427 for the pixel channel, based on how close the observed hue value is from clipping for the given color channel. The details about operation of intensity value calculator circuit 505 are described below with reference to FIG. 6.

Hue processor 510 is a circuit that examines values of target hue 425 for the plurality of color channels of the pixel and generates corresponding select signal 525, based on the values of target hues 425. When hue processor 510 determines that target hue 425 for the color channel under consideration for hue preservation post processing has a largest value among all target hues 425 for the plurality of color channels of the pixel, hue processor 510 generates a corresponding value for select signal 525 so that soft clipped value 520 for the color channel is output via demultiplexer 515 as output pixel value 530 for the color channel. Thus, in this case, no further hue preservation post processing is performed and HPPP circuit 440 is disabled to save power. Output pixel value 530 corresponding to soft clipped value 520 for the color channel represents a recovered hue value for the color channel of the pixel. On the other hand, when hue processor 510 determines that target hue 425 for the color channel is not the largest among all target hues 425 for the plurality of color channels of the pixel, hue processor 510 generates a corresponding value for select signal 525 so that soft clipped value 520 for the color channel can be passed via demultiplexer 515 to HPPP circuit 440 as soft clipped value 435. HPPP circuit 440 then performs hue preservation post processing to compute HPPP value 445 for the color channel of the pixel.

Example Circuitry for Hue Preservation Post Processing

Figure 6:
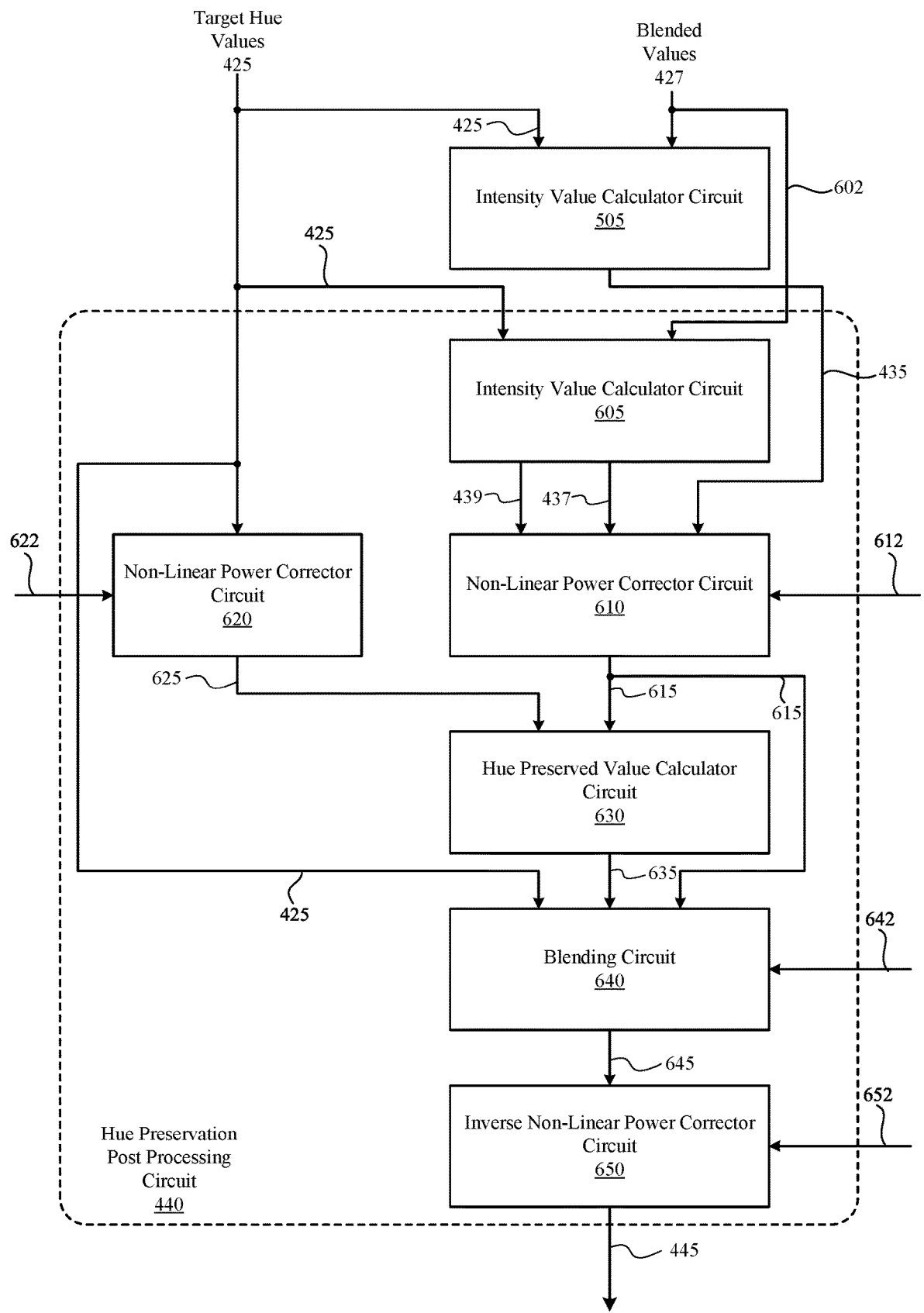
FIG. 6 is a block diagram illustrating a hue preservation post processing circuit, according to one embodiment.

FIG. 6 is a block diagram illustrating HPPP circuit 440 of FIG. 4, according to one embodiment. Intensity value calculator circuit 505 of hue recovery circuit 430 determines intensity value 435 for a color channel of a pixel in input image 410 where the pixel has at least one color channel with an intensity value above a predetermined threshold. Intensity value calculator circuit 505 may determine intensity value 435 for the color channel of the pixel by performing, e.g., soft clipping in order to translate pixel values to under a maximum pixel value. Soft clipping is performed such that the pixel values—after being soft clipped—do not have any discontinuities in the soft clipping curve as well as a derivative of the soft clipping curve because human eyes are sensitive to the derivative of the curve. Intensity value 435 is hereinafter referred to as soft clipped value 435, although intensity value 435 can be obtain by performing some other methods different from soft clipping.

Intensity value calculator circuit 505 determines soft clipped value 435 for the color channel using corresponding ratios of target hues 425 for the plurality of color channels of the pixel and corresponding blended value 427 for the color channel of the pixel. Intensity value calculator circuit 505 determines soft clipped value 435 for the color channel by applying a soft clipping curve on blending value 427 for the color channel of the pixel. An example soft clipping curve is a piecewise linear curve. A first portion of the piecewise linear curve includes a first threshold value (e.g., 60% of the maximum pixel value) such that any pixel with a blended value that is less than or equal to the first threshold value is not changed during soft clipping. A second portion of the piecewise linear curve is applicable for pixels with a blended value greater than the first threshold value such that the blended values of those pixels are soft clipped to ensure that those pixel values are bended to be within the maximum pixel value.

An example soft clipping curve applied by intensity value calculator circuit 505 for, e.g., the Green channel, may be implemented using the following set of equations:

$$\text{maxLevelG} = \text{maximum (ClipLevel\_G, ClipLevel\_R}*(G_T/R_T), \quad (1.1)$$
$$\text{ClipLevel\_B}*(G_T/B_T))$$
$$\text{alphaG} = \text{minimum (maxClip, maxLevelG)} * \text{alphaRatio} \quad (1.2)$$
$$\text{betaG} = \text{maxLevelG/maxClip} \quad (1.3)$$
$$\text{Gnorm2} = (\text{Gblnd} - \text{alphaG}) / (\text{maxLevelG} - \text{alphaG}) \quad (1.4)$$
if (Gblnd > alphaG) {
softInterpG = interp2D ((Gnorm2, betaG), DSLUT)
$G_{SC}$ = alphaG + (maxClip − alphaG) * softInterpG
} else
$$G_{SC} = \text{Bblnd} \quad (1.5)$$

In the above equations, 1.1 through 1.5, $R_T$, $G_T$, $B_T$ are target hues 425 for the Red, Green and Blue channel, respectively. maxLevelG represents a maximum hue value for the Green channel of the pixel during the blending process. maxClip represents a maximum pixel value after soft clipping is performed such as ClipLevel_G for the Green channel. ClipLevel_R, ClipLevel_G, ClipLevel_B represent a maximum hue level of the Red, Green and Blue channel, respectively. alphaG represents a threshold hue value such that any blended value 427 (i.e., Gblnd) that is less than or equal to alphaG is not changed. Here, alphaRatio is programmable and provides a representation of the threshold value. If the blended value is larger than the threshold value, alphaG, soft clipping is performed by an interpolation using the ratios betaG and Gnorm2, and by selecting a curve DSLUT. betaG represents a ratio between the maximum hue value during the blending process and the maximum possible pixel value after soft clipping. Bnorm2 represents a ratio between how far the blended value is from the threshold value and how far the maximum hue value during the blending process is from the threshold value. DSLUT represents a curve that hue recovery circuit 430 selects for performing soft clipping based on maxLevelG and maxClip values. DSLUT may be implemented as a look-up table stored in, e.g., system memory 230 containing a set of curves. softInterpG represents a 2D interpolation scheme that results in continuous values both for the interpolated values and their first order derivative. $G_{SC}$ represents, e.g., soft clipped value 435 of the Green channel after bending blended pixel value 427 for the Green channel to be within ClipLevel_G.

An example soft clipping curve applied by intensity value calculator circuit 505 for, e.g., the Red channel, may be implemented using the following set of equations:

--- maxLevelR = maximum (ClipLevel_R, ClipLevel_G*($R_T/G_T$),   (2.1)
ClipLevel_B*($R_T/B_T$))
    alphaR = minimum (maxClip, maxLevelR) * alphaRatio   (2.2)
    betaR = maxLevelR/maxClip   (2.3)
    Rnorm2 = (Rblnd − alphaR) / (maxLevelR − alphaR)   (2.4)
    if (Rblnd > alphaR) {
        softInterpR = interp2D ((Rnorm2, betaR),
        DSLUT)
        $R_{SC}$ = alphaR + (maxClip −
        alphaR) * softInterpR
    } else
        $R_{SC}$ = Rblnd   (2.5)

---

In the above equations, 2.1 through 2.5, maxLevelR represents a maximum hue value for the Red channel of the pixel during the blending process. maxClip represents a maximum pixel value after soft clipping is performed such as ClipLevel_R for the Red channel. alphaR represents a threshold hue value such that any blended value 427 (i.e., Rblnd) that is less than or equal to alphaR is not changed. If the blended value is larger than the threshold value, alphaR, soft clipping is performed by an interpolation using the ratios betaR and Rnorm2, and by selecting a curve DSLUT betaR represents a ratio between the maximum hue value during the blending process and the maximum possible pixel value after soft clipping. DSLUT represents a curve that hue recovery circuit 430 selects (e.g., from system memory 230) for performing soft clipping based on maxLevelR and maxClip values. softInterpR represents a 2D interpolation scheme that results in continuous values both for the interpolated values and their first order derivative. $R_{SC}$ represents, e.g., soft clipped value 435 of the Red channel after bending blended pixel value 427 for the Red channel to be within ClipLevel_R.

An example soft clipping curve applied by intensity value calculator circuit 505 for, e.g., the Blue channel, may be implemented using the following set of equations:

--- maxLevelB = maximum (ClipLevel_B, ClipLevel_G*($B_T/G_T$),   (3.1)
ClipLevel_R*($B_T/R_T$))
    alphaB = minimum (maxClip, maxLevelB) * alphaRatio   (3.2)
    betaB = maxLevelB/maxClip   (3.3)
    Bnorm2 = (Bblnd − alphaB) / (maxLevelB − alphaB)   (3.4)
    if (Bblnd > alphaB) {
        softInterpB = interp2D ((Bnorm2, betaB),
        DSLUT)
        $B_{SC}$ = alphaB + (maxClip −
        alphaB) * softInterpB
    } else
        $B_{SC}$ = Bblnd   (3.5)

---

In the above equations, 3.1 through 3.5, maxLevelB represents a maximum hue value for the Blue channel of the pixel during the blending process. maxClip represents a maximum pixel value after soft clipping is performed such as ClipLevel_B for the Blue channel. alphaB represents a threshold hue value such that any blended value 427 (i.e., Bblnd) that is less than or equal to alphaB is not changed. If the blended value is larger than the threshold value, alphaB, soft clipping is performed by an interpolation using the ratios betaB and Bnorm2, and by selecting a curve DSLUT. betaB represents a ratio between the maximum hue value during the blending process and the maximum possible pixel value after soft clipping. DSLUT represents a curve that hue recovery circuit 430 selects (e.g., from system memory 230) for performing soft clipping based on maxLevelB and maxClip values. softInterpB represents a 2D interpolation scheme that results in continuous values both for the interpolated values and their first order derivative. $B_{SC}$ represents, e.g., soft clipped value 435 of the Blue channel after bending blended pixel value 427 for the Blue channel to be within ClipLevel_B.

If the condition for early exit of hue preservation post processing is not fulfilled and the color channel under consideration for hue preservation post processing is not a color channel with a largest intensity among the plurality of color channels of the pixel, operations of HPPP circuit 440 for the color channel are enabled. Intensity value calculator circuit 605 of HPPP circuit 440 determines soft clipped values 437, 439 for remaining color channels of the plurality of color channels (e.g., two color channels in the case of RGB color format). Each of the soft clipped values 437, 439 is determined based on corresponding ratios of target hues 425 for the plurality of color channels of the pixel and blended values 427 for the remaining color channels of the pixel. Intensity value calculator circuit 605 determines each soft clipped value 437, 439 by applying, e.g., a corresponding soft clipping curve on corresponding blended value 427 for that color channel. For example, when soft clipped value 435 is determined for the Green channel, intensity value calculator circuit 605 determines soft clipped values 437, 439 for the Red and Blue channels respectively by applying the soft clipping curves as defined by equations 2.1 through 2.5 and equations 3.1 through 3.5. Thus, intensity value calculator circuit 605 may perform the same soft clipping operations as intensity value calculator circuit 505 but for different color channels. In an alternative embodiment (not shown in FIG. 6), intensity value calculator circuit 505 and intensity value calculator circuit 605 are part of a single intensity value calculator circuit that performs soft clipping by applying appropriate soft clipping curves on blended pixel values 427 for corresponding color channels.

Non-linear power corrector circuit 610 performs non-linear gamma mapping (i.e., non-linear power transformation) of soft clipped values 435, 437, 439 using gamma value 612 (e.g., retrieved from system memory 230) to generate transformed soft clipped (intensity) values 615 for the plurality of color channels. For RGB color format, the non-linear power transformation performed by non-linear power corrector circuit 610 can be defined as following:

$$r_{in}=R_{SC}^{\gamma}, g_{in}=G_{SC}^{\gamma}, b_{in}=B_{SC}^{\gamma}, \quad (4)$$

where $R_{SC}$, $G_{SC}$, $B_{SC}$ are soft clipped values 435, 437, 439 for the Red, Green and Blue channel respectively, γ is gamma value 612, and $r_{in}$, $g_{in}$, $b_{in}$ are transformed soft clipped values 615 for the Red, Green and Blue channel, respectively. The gamma mapping given by equation 4 and performed by non-linear power corrector circuit 610 can be implemented as a look-up table stored in, e.g., system memory 230 containing a set of curves, each curve representing a 1D interpolation scheme. An appropriate look-up table for a corresponding color channel is retrieved from system memory 230 at non-linear power corrector circuit 610 by being indexed using a corresponding soft clipped value 435, 437, 439.

Non-linear power corrector circuit 620 performs the non-linear power transformation (e.g., gamma mapping) of target hues 425 for the plurality of color channels using gamma value 622 (e.g., retrieved from system memory 230) to generate transformed target hues 625 for the plurality of color channels of the pixel. The non-linear power transformation of target hues 425 provides a more natural hue transition towards white. For RGB color format, the non-linear power transformation performed by non-linear power corrector circuit 620 can be defined as following:

$$r_T = R_T^\gamma, g_T = G_T^\gamma, b_T = B_T^\gamma, \qquad (5)$$

where $R_T$, $G_T$, $B_T$ are target hues for the Red, Green and Blue channels respectively, γ is gamma value 622, and $r_T$, $g_T$, $b_T$ are transformed target hues 625 for the plurality of color channels. Transformed soft clipped values 615 and transformed target hues 625 for the plurality of color channels are passed onto hue preserved value calculator circuit 630. The gamma mapping given by equation 5 and performed by non-linear power corrector circuit 620 can be implemented as a look-up table stored in, e.g., system memory 230 containing a set of curves, each curve representing a 1D interpolation scheme. An appropriate look-up table for a corresponding color channel is retrieved from system memory 230 at non-linear power corrector circuit 620 by being indexed using a corresponding target hue 425.

Hue preserved value calculator circuit 630 is a circuit that determines hue preserved value 635 for the color channel of the pixel such that a color hue is preserved along with either luminance or saturation. Hue preserved value calculator circuit 630 determines hue preserved value 635 for the color channel of the pixel using transformed soft clipped values 615 and transformed target hues 625 for the plurality of color channels of the pixel. In embodiments when the color hue is preserved along with saturation, hue preserved value calculator circuit 630 determines an incoming luminance value $Y_{in}$ for the pixel as a minimum of transformed soft clipped values 615 for the plurality of color channels of the pixel. For RGB color format, hue preserved value calculator circuit 630 determines the incoming luminance value $Y_{in}$ as following:

$$Y_{in} = \text{minimum}(r_{in}, g_{in}, b_{in}). \qquad (6)$$

When the color hue is preserved along with saturation, hue preserved value calculator circuit 630 also determines a reference luminance value $Y_T$ for the pixel as a minimum of transformed target hues 625 for the plurality of color channels of the pixel. For RGB color format, hue preserved value calculator circuit 630 determines the reference luminance value $Y_T$ as following:

$$Y_T = \text{minimum}(r_T, g_T, b_T). \qquad (7)$$

Alternatively, when the color hue is preserved along with luminance, hue preserved value calculator circuit 630 determines an incoming luminance value $Y_{in}$ for the pixel as a weighted average of transformed soft clipped values 615 for the plurality of color channels of the pixel. For RGB color format, hue preserved value calculator circuit 630 determines the incoming luminance value $Y_{in}$ as following:

$$Y_{in} = C_r * r_{in} + C_g * g_{in} + C_b * b_{in} \qquad (8)$$

where $C_r$, $C_g$ and $C_b$ are positive luminance coefficients for the Red, Green and Blue channels respectively, and a sum of the luminance coefficients is constrained to be equal unity. When the color hue is preserved along with luminance, hue preserved value calculator circuit 630 also determines a reference luminance value $Y_T$ for the pixel as a weighted average of transformed target hues 625 for the plurality of color channels of the pixel. For RGB color format, hue preserved value calculator circuit 630 determines the reference luminance value $Y_T$ as following:

$$Y_T = C_r * r_T + C_g * g_T + C_b * b_T \qquad (9)$$

Under the constraint of saturation being preserved (i.e., constant saturation), HPPP circuit 440 performs hue preservation post processing by keeping a difference between a maximum of pixel channel values and a minimum of pixel channel values constant, while changing a median of pixel channel values. Similarly, under the constraint of luminance being preserved (i.e., constant luminance), HPPP circuit 440 performs hue preservation post processing by keeping a difference between a maximum of pixel channel values and a pixel luminance constant. For preserving a color hue along with either saturation or luminance, hue preserved value calculator circuit 630 further determines a color cross ratio for the pixel as a ratio between an incoming difference value and a reference difference value. Hue preserved value calculator circuit 630 determines the incoming difference value for the pixel as a difference between a maximum of transformed soft clipped values 615 for the plurality of color channels of the pixel, e.g., maximum ($r_{in}$, $g_{in}$, $b_{in}$) and the incoming luminance value $Y_{in}$ for the pixel. Hue preserved value calculator circuit 630 determines the reference difference value for the pixel as a difference between a maximum of transformed target hues 625 for the plurality of color channels of the pixel, e.g., maximum ($r_T$, $g_T$, $b_T$) and the reference luminance value $Y_T$ for the pixel.

Thus, for RGB color format, hue preserved value calculator circuit 630 determines a color cross ratio h for the pixel as following:

$$h = [\text{maximum}(r_{in}, g_{in}, b_{in}) - Y_{in}] / [\text{maximum}(r_T, g_T, b_T) - Y_T] \qquad (10)$$

If the reference difference value is equal to zero (i.e., the nominator in equation 10 is zero), then blending circuit 640 and inverse non-linear power corrector circuit 650 are bypassed and HPPP value 445 for the color channel of the pixel that is output by HPPP circuit 400 is a soft clipped value for the color channel, i.e., corresponding soft clipped value 435, 437, 439.

If the reference difference value is not zero, hue preserved value calculator circuit 630 determines hue preserved value 635 for the color channel of the pixel, using the incoming luminance value, the reference luminance value, the color cross ratio and corresponding transformed target hue 625 for the color channel of the pixel. For RGB color format, hue preserved value calculator circuit 630 determines hue preserved value 635 for the Red channel of the pixel, $R_{HP}$, as following:

$$R_{HP} = Y_{in} + (r_T - Y_T) * h \qquad (11)$$

Similarly, hue preserved value calculator circuit 630 determines hue preserved values 635 for the Green and Blue channels of the pixel, $G_{HP}$ and $B_{HP}$, as following:

$$G_{HP} = Y_{in} + (g_T - Y_T) * h \qquad (12)$$

$$B_{HP} = Y_{in} + (b_T - Y_T) * h \qquad (13)$$

Blending circuit 640 performs blending between hue preserved value 635 and transformed soft clipped value 615 for the color channel of the pixel, using a blending weight $W_{HP}$ that represents a chromatically dependent weighting factor. Blending circuit 640 blends, based on target hues 425 for the plurality of color channels, hue preserved value 635 and transformed soft clipped value 615 for the color channel of the pixel to generate hue preserved output value 645 for the color channel of the pixel. Blending circuit 640 determines the blending weight $W_{HP}$ using two chromaticity values computed based on target hues 425 for the plurality of color channels. Blending circuit 640 determines a first chromaticity value $C_1$ and a second chromaticity value $C_2$ as following:

$$C_1 = R_T/(R_T + G_T + B_T) \quad (14)$$

$$C_2 = G_T/(R_T + G_T + B_T) \quad (15)$$

Blending circuit 640 determines the blending weight $W_{HP}$ as a function of the first and second chromaticity values. For example, blending circuit 640 determines the blending weight $W_{HP}$ by indexing look-up table 642 stored in system memory 230 by the first and second chromaticity values. Blending circuit 640 then blends hue preserved value 635 and transformed soft clipped value 615 for the color channel of the pixel using the blending weight $W_{HP}$ to generate hue preserved output value 645 for the color channel of the pixel. For RGB color format, blending circuit 640 determines hue preserved output value 645 for the Red channel of the pixel, $R_{HP\_OUT}$, as follows:

$$R_{HP\_OUT} = R_{HP} * (1 - W_{HP}) + r_{in} * W_{HP} \quad (16)$$

Similarly, blending circuit 640 determines hue preserved output values 645 for the Green and Blue channels of the pixel, $G_{HP\_OUT}$ and $B_{HP\_OUT}$, as follows:

$$G_{HP\_OUT} = G_{HP} * (1 - W_{HP}) + g_{in} * W_{HP} \quad (17)$$

$$B_{HP\_OUT} = B_{HP} * (1 - W_{HP}) + b_{in} * W_{HP} \quad (18)$$

Inverse non-linear power corrector circuit 650 inverts the non-linear power transformation performed by non-linear power corrector circuits 610, 620 to generate HPPP value 445 for the color channel of the pixel. Inverse non-linear power corrector circuit 650 performs an inverse of the non-linear power transformation (e.g., de-gamma mapping) of hue preserved output value 645 for the color channel of the pixel to generate HPPP value 445 for the color channel of the pixel. For RGB color format, the inverse non-linear power transformation performed by inverse non-linear power corrector circuit 650 can be defined as follows:

$$R_{HPPP\_OUT} = R_{HP\_OUT}^{1/\gamma},$$

$$G_{HPPP\_OUT} = G_{HP\_OUT}^{1/\gamma},$$

$$B_{HPPP\_OUT} = B_{HP\_OUT}^{1/\gamma}, \quad (19)$$

where $R_{HPPP\_OUT}$ is HPPP value 445 for the Red channel, $G_{HPPP\_OUT}$ is HPPP value 445 for the Green channel, $B_{HPPP\_OUT}$ is HPPP value 445 for the Blue channel, and $1/\gamma$ is inverse gamma value 652 that may be retrieved from system memory 230. The inverse non-linear mapping given by equation 19 and performed by non-linear power corrector circuit 620 can be implemented as a look-up table stored in, e.g., system memory 230 containing a set of curves, each curve representing a 1D interpolation scheme. An appropriate look-up table for a corresponding color channel is retrieved from system memory 230 at inverse non-linear power corrector circuit 650 by being indexed using a corresponding hue preserved output value 645. Blending circuit 640 and inverse non-linear power corrector circuit 650 may be part of hue preservation processor that generates a recovered version of input image 410 with adjusted hue information having HPPP values 445 for corresponding color channels of one or more pixels.

HPPP value 445 for the color channel of the pixel may be further multiplied by a configurable ceiling gain to obtain a corresponding dynamic range for an output intensity value for the color channel of the pixel. HPPP value 445 represents an intensity value for the color channel of the pixel in a recovered version of input image 410 where hue information of the color channel of the pixel is appropriately adjusted. HPPP circuit 400 may repeat determination of one or more other HPPP values 445 for one or more other color channels of the pixel having at least one color channel with an intensity value above a predetermined threshold (e.g., alphaRatio defined in equations 1.2, 2.2 and 3.2). Thus, hue preservation post processing operations performed by HPPP circuit 400 may be performed (e.g., in the pipeline manner) for multiple color channels of a pixel having at least one color channel with an intensity above the predetermined threshold. On the other hand, hue preservation post processing is not performed for a color channel of the pixel having a largest intensity among the plurality of color channels of the pixel. In an alternative embodiment, instead of a single HPPP circuit 400, raw processing stage 306 may include multiple (e.g., two) HPPP circuits 400 that determine HPPP values 445 for multiple color channels (e.g., two color channels) of the pixel. Hue preservation post processing performed by HPPP circuit 440 can be performed for all pixels in input image 410 to generate a recovered version of input image with preserved color hue information.

Example Process for Hue Preservation Post Processing

Figure 7:
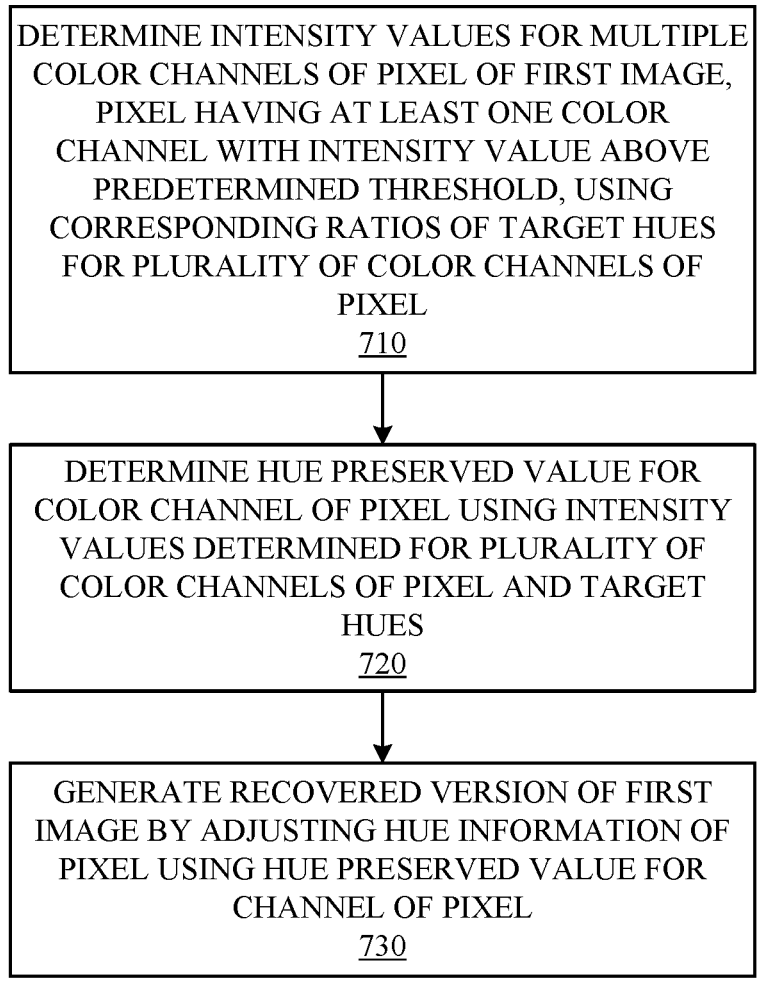
FIG. 7 is a flowchart illustrating a method of hue preservation post processing, according to one embodiment.

FIG. 7 is a flowchart illustrating a method of hue preservation post processing, according to one embodiment. The method may include additional or fewer steps, and steps may be performed in different orders. HPPP circuit 440, as described with reference to FIG. 4 through FIG. 6, determines 710 intensity values (e.g., soft clipped values) for multiple color channels of a plurality of color channels of a pixel of a first image (e.g., input image 410), using corresponding ratios of target hues for the plurality of color channels of the pixel. The pixel has least one color channel with an intensity above a predetermined threshold (e.g., alphaRatio). HPPP circuit 440 further receives an intensity value (e.g., a soft clipped value) for a channel of the plurality of color channels of the pixel, e.g., determined by hue recovery circuit 430. Note that the channel under consideration for hue preservation post processing performed by HPPP circuit 440 has an intensity that is not the largest among all intensities of the plurality of color channels of the pixel. Hue preservation post processing is not performed for the color channel and the HPPP circuit 440 is disabled to save power, if a target hue for the color channel is the largest among all target hues of the plurality of color channels of the pixel.

HPPP circuit 440 determines 720 a hue preserved value for the color channel of the plurality of color channels of the pixel, using the intensity values determined for the plurality of color channels of the pixel and the target hues. HPPP circuit 440 performs a non-linear power transformation of the intensity values to generate a plurality of transformed intensity values for the plurality of color channels of the pixel. HPPP circuit 440 further performs the non-linear power transformation of the target hues to generate transformed target hues for the plurality of color channels of the pixel. Then, HPPP circuit determines 720 the hue preserved value using the transformed intensity values and a corresponding transformed target hue for the color channel of the pixel.

HPPP circuit 440 generates 730 a recovered version of the first image (e.g., a recovered version of input image 410) by adjusting hue information of the pixel, using the hue preserved value for the channel of the plurality of color channels of the pixel.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. An apparatus for processing image signal data, comprising:
    a hue target circuit configured to generate a plurality of target hues for a plurality of color channels of each pixel in an image based on a plurality of candidate hue maps;
    an intensity value calculator circuit configured to determine a plurality of intensity values for the plurality of color channels of a pixel in the image, the pixel having at least one of the intensity values above a predetermined threshold, using corresponding ratios of the target hues for the plurality of color channels of the pixel;
    a hue preserved value calculator circuit configured to determine a hue preserved value for a color channel of the plurality of color channels of the pixel, using the intensity values and the target hues; and
    a hue preservation processor configured to generate a recovered version of the image by adjusting hue information of the pixel, using the hue preserved value for the color channel of the pixel.

2. The apparatus of claim 1, further comprising:
    a first non-linear power corrector circuit configured to perform a non-linear power transformation of the intensity values to generate a plurality of tra3nsformed intensity values for the plurality of color channels of the pixel; and
    a second non-linear power corrector circuit configured to perform the non-linear power transformation of the target hues to generate a plurality of transformed target hues for the plurality of color channels of the pixel,
    wherein the hue preserved value calculator circuit is further configured to determine the hue preserved value using the transformed intensity values and a corresponding transformed target hue of the plurality of transformed target hues for the color channel of the pixel.

3. The apparatus of claim 2, wherein the hue preserved value calculator circuit is further configured to:
    determine a first luminance value for the pixel as a minimum of the transformed intensity values,
    determine a second luminance value for the pixel as a minimum of the transformed target hues,
    determine a first difference value for the pixel as a difference between a maximum of the transformed intensity values and the first luminance value,
    determine a second difference value for the pixel as a difference between a maximum of the transformed target hues and the second luminance value,
    determine a color cross ratio for the pixel as a ratio between the first difference value and the second difference value, and
    determine the hue preserved value for the color channel of the pixel, using the first luminance value, the second luminance value, the color cross ratio and the corresponding transformed target hue for the color channel.

4. The apparatus of claim 2, further comprising:
    a blending circuit configured to blend, based on the target hues, the hue preserved value and a corresponding transformed intensity value of the plurality of transformed intensity values for the color channel of the pixel to generate a hue preserved output value for the color channel of the pixel.

5. The apparatus of claim 2, further comprising a blending circuit configured to:
    determine a first chromaticity value for the pixel as a ratio between a target hue of the plurality of target hues and a sum of the target hues,
    determine a second chromaticity value for the pixel as a ratio between another target hue of the plurality of target hues and the sum,
    determine a hue preservation weight as a function of the first chromaticity value and the second chromaticity value, and
    blend, based on the hue preservation weight, the hue preserved value and a corresponding transformed intensity value of the plurality of transformed intensity values for the color channel of the pixel to generate a hue preserved output value for the color channel of the pixel.

6. The apparatus of claim 5, further comprising an inverse non-linear power corrector circuit configured to:
    perform an inverse of the non-linear power transformation of the hue preserved output value for the color channel of the pixel to generate a hue preserved post processed (HPPP) value for the color channel of the pixel.

7. The apparatus of claim 6, wherein the hue preservation processor is further configured to:
    generate the recovered version of the image by adjusting the hue information of the pixel using the HPPP value for the color channel of the pixel.

8. The apparatus of claim 1, further comprising a hue processor configured to:
    compare, for each color channel, the target hues for the plurality of color channels of the pixel, and
    select a corresponding intensity value of the plurality of intensity values for that color channel of the pixel as the hue preserved value for that color channel, when a target hue of the plurality of target hues for that color channel is the largest among the plurality of target hues.

9. The apparatus of claim 1, wherein the intensity value calculator circuit is configured to:
    determine a first ratio between a first of the target hues for a first of the color channels and a second of the target hues for a second of the color channels,
    determine a second ratio between the first target hue for the first color channel and a third of the target hues for a third of the color channels, and
    determine one of the intensity values for the first color channel of the pixel using the first ratio and the second ratio.

10. A method, comprising:
generating a plurality of target hues for a plurality of color channels of each pixel in an image based on a plurality of candidate hue maps;
determining a plurality of intensity values for the plurality of color channels of a pixel in the image, the pixel having at least one of the intensity values above a predetermined threshold, using corresponding ratios of the target hues for the plurality of color channels of the pixel;
determining a hue preserved value for a color channel of the plurality of color channels of the pixel, using the intensity values and the target hues; and
generating a recovered version of the image by adjusting hue information of the pixel, using the hue preserved value for the color channel of the pixel.

11. The method of claim 10, further comprising:
performing a non-linear power transformation of the intensity values to generate a plurality of transformed intensity values for the plurality of color channels of the pixel;
performing the non-linear power transformation of the target hues to generate a plurality of transformed target hues for the plurality of color channels of the pixel; and
determining the hue preserved value using the transformed intensity values and a corresponding transformed target hue of the plurality of transformed target hues for the color channel of the pixel.

12. The method of claim 11, further comprising:
determining a first luminance value for the pixel as a minimum of the transformed intensity values;
determining a second luminance value for the pixel as a minimum of the transformed target hues;
determining a first difference value for the pixel as a difference between a maximum of the transformed intensity values and the first luminance value;
determining a second difference value for the pixel as a difference between a maximum of the transformed target hues and the second luminance value;
determining a color cross ratio for the pixel as a ratio between the first difference value and the second difference value; and
determining the hue preserved value for the color channel of the pixel, using the first luminance value, the second luminance value, the color cross ratio and the corresponding transformed target hue for the color channel.

13. The method of claim 11, further comprising:
blending, based on the target hues, the hue preserved value and a corresponding transformed intensity value of the plurality of transformed intensity values for the color channel of the pixel to generate a hue preserved output value for the color channel of the pixel.

14. The method of claim 11, further comprising:
determining a first chromaticity value for the pixel as a ratio between a target hue of the plurality of target hues and a sum of the target hues;
determining a second chromaticity value for the pixel as a ratio between another target hue of the plurality of target hues and the sum;
determining a hue preservation weight as a function of the first chromaticity value and the second chromaticity value; and
blending, based on the hue preservation weight, the hue preserved value and a corresponding transformed intensity value of the plurality of transformed intensity values for the color channel of the pixel to generate a hue preserved output value for the color channel of the pixel.

15. The method of claim 14, further comprising:
performing an inverse of the non-linear power transformation of the hue preserved output value for the color channel of the pixel to generate a hue preserved post processed (HPPP) value for the color channel of the pixel.

16. The method of claim 15, further comprising:
generating the recovered version of the first image by adjusting the hue information of the pixel using the HPPP value for the color channel of the pixel.

17. The method of claim 10, further comprising:
comparing, for each color channel, the target hues for the plurality of color channels of the pixel; and
selecting a corresponding intensity value of the plurality of intensity values for that color channel of the pixel as the hue preserved value for that color channel, when a target hue of the plurality of target hues for that color channel is the largest among the plurality of target hues.

18. The method of claim 10, further comprising:
determining a first ratio between a first of the target hues for a first of the color channels and a second of the target hues for a second of the color channels;
determining a second ratio between the first target hue for the first color channel and a third of the target hues for a third of the color channels; and
determining one of the intensity values for the first color channel of the pixel using the first ratio and the second ratio.

19. An electronic device, comprising:
an image sensor configured to capture an image comprising a pixel with hue information having at least one color channel of a plurality of color channels with an intensity above a predetermined threshold; and
an image signal processor coupled to the image sensor, the image signal processor configured to perform raw processing of the first image to obtain a raw processed version of the image having the plurality of color channels, the image signal processor including:
a hue target circuit configured to generate a plurality of target hues for the plurality of color channels of each pixel in the image based on a plurality of candidate hue maps,
an intensity value calculator circuit configured to determine intensity values for the plurality of color channels of the pixel, using corresponding ratios of the target hues for the plurality of color channels of the pixel,
a hue preserved value calculator circuit configured to determine a hue preserved value for a color channel of the plurality of color channels of the pixel, using the intensity values and the target hues, and
a hue preservation processor configured to generate the raw processed version of the image by adjusting the hue information of the pixel, using the hue preserved value for the color channel of the pixel.

20. The device of claim 19, wherein the image signal processor further includes:
a first non-linear power corrector circuit configured to perform a non-linear power transformation of the intensity values to generate a plurality of transformed intensity values for the plurality of color channels of the pixel, and
a second non-linear power corrector circuit configured to perform the non-linear power transformation of the target hues to generate a plurality transformed target hues for the plurality of color channels of the pixel, wherein the hue preserved value calculator circuit is further configured to determine the hue preserved value using the transformed intensity values and a corresponding transformed target hue of the plurality of transformed target hues for the color channel of the pixel.

\* \* \* \* \*

UNITED STATES PATENT AND TRADEMARK OFFICE
CERTIFICATE OF CORRECTION

PATENT NO. : 11,100,620 B2  
APPLICATION NO. : 16/121389  
DATED : August 24, 2021  
INVENTOR(S) : Touraj Tajbakhsh Page 1 of 1

It is certified that error appears in the above-identified patent and that said Letters Patent is hereby corrected as shown below:

In the Claims

Column 21, Claim 1, Line 46: Replace "values to generate a plurality of tra3nsformed intensity" with --values to generate a plurality of transformed intensity--

Column 24, Claim 19, Line 39: Replace "raw processing of the first image to obtain a raw" with --raw processing of the image to obtain a raw--

Signed and Sealed this  
Twenty-second Day of February, 2022

Drew Hirshfeld  
*Performing the Functions and Duties of the*  
*Under Secretary of Commerce for Intellectual Property and*  
*Director of the United States Patent and Trademark Office*